United States Patent
Gundersen et al.

(10) Patent No.: US 10,281,918 B2
(45) Date of Patent: May 7, 2019

(54) CONTROL SYSTEM FOR OPERATING A VESSEL

(71) Applicant: ABB Schweiz AG, Baden (CH)

(72) Inventors: Borre Gundersen, Oslo (NO); Kristoffer Dønnestad, Oslo (NO); Matko Barisic, Oslo (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/060,670

(22) PCT Filed: Dec. 18, 2015

(86) PCT No.: PCT/EP2015/080538
§ 371 (c)(1),
(2) Date: Jun. 8, 2018

(87) PCT Pub. No.: WO2017/102028
PCT Pub. Date: Jun. 22, 2017

(65) Prior Publication Data
US 2018/0364718 A1  Dec. 20, 2018

(51) Int. Cl.
*B60L 3/00* (2019.01)
*B60L 15/00* (2006.01)
(Continued)

(52) U.S. Cl.
CPC .......... *G05D 1/0206* (2013.01); *B63H 21/20* (2013.01); *B63H 25/42* (2013.01); *B63J 99/00* (2013.01);
(Continued)

(58) Field of Classification Search
CPC ...... G05D 1/0206; B63H 21/00; B63H 25/42; B63J 99/00
(Continued)

(56) References Cited

U.S. PATENT DOCUMENTS 6,678,589 B2    1/2004  Robertson et al.
2006/0064211 A1*  3/2006  Johansen ........... G05B 23/0256
                                             701/21
(Continued)

FOREIGN PATENT DOCUMENTS

EP      1914162 A1    4/2008
EP      2423103 A1    2/2012
(Continued)

OTHER PUBLICATIONS

International Preliminary Report on Patentability Application No. PCT/EP2015/080538 dated Nov. 29, 2017 6 pages.
(Continued)

*Primary Examiner* — Mahmoud S Ismail
(74) *Attorney, Agent, or Firm* — Whitmyer IP Group LLC (57) ABSTRACT

A control system for controlling a vessel, a method for controlling dynamic positioning of the vessel or ship, and a computer program for carrying out the method are disclosed. The vessel includes an electrical power grid, at least one combustion engine driven power generator, and an energy storage medium. The power grid is arranged to provide power to an electric motor driving one or more thrusters or propellers of the vessel. The control system further includes a control unit arranged with computer programs and hardware configured to: calculate a Remaining Operation Window time for carrying out dynamic positioning powered by the energy storage medium, generate and display information including a time period for the Remaining Operation Window of dynamic positioning, and carry out an automatic control action in relation to at least one of a power generator or power consuming device connected to the power grid.

20 Claims, 7 Drawing Sheets

(51) Int. Cl.
  *G05D 1/00*    (2006.01)
  *G05D 3/00*    (2006.01)
  *G06F 7/00*    (2006.01)
  *G06F 17/00*   (2019.01)
  *G05D 1/02*    (2006.01)
  *B63H 25/42*   (2006.01)
  *B63H 21/20*   (2006.01)
  *B63J 99/00*   (2009.01)
  *G05D 3/12*    (2006.01)
  *G05D 5/00*    (2006.01)
  *G05D 9/00*    (2006.01)
  *G05D 11/00*   (2006.01)
  *G05D 17/00*   (2006.01)

(52) U.S. Cl.
  CPC ... *B63H 2021/205* (2013.01); *B63J 2099/008* (2013.01)

(58) Field of Classification Search
  USPC ............................................ 701/21; 700/291
  See application file for complete search history.

(56) References Cited

U.S. PATENT DOCUMENTS

| | | |
|---|---|---|
| 2010/0106350 A1 | 4/2010 | Alston |
| 2015/0032306 A1* | 1/2015 | Mathiesen ............ B63H 25/42 701/21 |
| 2015/0051746 A1* | 2/2015 | Mathiesen ................ H02J 3/14 700/291 |
| 2015/0142227 A1 | 5/2015 | Stephens |
| 2018/0159330 A1* | 6/2018 | Kang ...................... B63J 99/00 |

FOREIGN PATENT DOCUMENTS

| | | |
|---|---|---|
| JP | 2012051500 A | 3/2012 |
| WO | 2005121915 A1 | 12/2005 |
| WO | 2007142537 A2 | 12/2007 |
| WO | 2012175624 A1 | 12/2012 |
| WO | 2013139609 A1 | 9/2013 |
| WO | 2013154242 A1 | 10/2013 |
| WO | 2015028636 A1 | 3/2015 |

OTHER PUBLICATIONS

International Search Report and Written Opinion of the International Searching Authority Application No. PCT/EP2015/080538 Completed: Aug. 9, 2016; dated Aug. 19, 2016 12 pages.

* cited by examiner

CONTROL SYSTEM FOR OPERATING A VESSEL

TECHNICAL FIELD

The present invention is concerned with a method for controlling dynamic positioning of a vessel such as a ship. In particular it is concerned with a method for monitoring and control of the ship during dynamic positioning, DP operations, as well as a control system and a computer program.

BACKGROUND

Ships are used extensively in the oil industry for carrying out work related to drilling oil wells and/or recovering oil from wells that have been drilled offshore. Well known marine waters include those such as in the North Sea and the Gulf of Mexico. Ships arranged for drilling oil wells and support ships for carrying out related work have to be able to maintain a position or course and position in order to carry out or assist in carrying out operations related to exploratory work, drilling, offloading samples, offloading oil, transferring supplies and so on.

Dynamic Positioning (DP) is a process for regulating the propellers or thrusters of a ship in order to maintain the ship at a position or on a course heading. The DP processes and procedures are typically computer controlled and may include a computer model representing the ship and also may model the actions of external forces such as wind, waves, tides etc. on the ship. The propellers, thrusters or other propulsion devices of the ship are continually or dynamically regulated in respect of thrust and thrust direction so as to counter effects of wind, waves, tides, currents and maintain a position. In this way a relative position, relative to another ship or to an object on the seabed, or an absolute position relative to eg a GPS position can be maintained dynamically even when the wind or tides or currents etc. vary from time to time.

In various DP class notations there are specific requirements to have a spinning reserve connected to the power plant. The term spinning reserve may be understood to refer to a generator and engine or other prime mover, a generator set, which is running at a low speed or idling. The prime mover can be accelerated up to a higher operating speed more quickly than a generator set could be started from a standstill and then brought up to speed. Thus in DP operations the spinning reserve is provided as a form of reserve power capacity in the "unused" spinning reserve connected to the power plant, capable of quickly delivering power in the event of a failure in rotating machinery or a sudden load increase. However, the spinning reserve requirement forces the combustion engine to run at a lower average power output, leading to a power plant running at a sub-optimum point with respect to fuel consumption. There is also a time lag between making a demand for a higher electrical power output from an idling generator set and delivery of a higher level of electrical power. The inventors have determined a need for an improvement to spinning reserve technology.

SUMMARY

An object of the present invention is to remedy one or more of the above mentioned problems with respect to providing a reserve power supply during a DP operation of a ship.

According to a first aspect of the invention this object is achieved through a method a for controlling dynamic positioning of a vessel, which vessel comprises an electrical power grid, at least one combustion engine driven power generator, and an energy storage medium, which power grid is arranged to provide power to an electric motor driving one or more thrusters or propellers of the vessel, wherein the control system comprises a control unit arranged with computer programs and hardware configured to: calculate a Remaining Operation Window time for carrying out dynamic positioning powered by the energy storage medium, generate and display information comprising a time period for the Remaining Operation Window of dynamic positioning, and carry out an automatic control action in relation to at least one of a power generator or power consuming device connected to the power grid.

The method disclosed automatically, and preferably regularly, such as perhaps every minute, calculates and presents the Remaining Operation Window time that would be powered by the Energy Storage Medium (ESM) after, for example, a failure. It will also generate an alarm if the ESM is not able to provide the requested operational window and it will advise the operator of needed actions. The method also covers a number of automatic or automatically initiated actions, based or predicated on the displayed and detected ability, or change in ability, of the ESM to act as a spinning reserve if the actions are so desired, and consequently enabled, by the operator of the vessel.

According to a second aspect of the invention this object is achieved through a control system for controlling dynamic positioning of a vessel, the system comprising an electrical power grid, at least one combustion engine driven power generator, and an energy storage medium, which power grid is arranged to provide power to an electric motor driving one or more thrusters or propellers of the vessel, wherein the control system comprises a control unit which is arranged with computer programs and hardware configured for carrying out the steps of: calculating a Remaining Operation Window time for carrying out dynamic positioning powered by the energy storage medium, generating and displaying information comprising the remaining operation time of dynamic positioning, and carrying out an automatic control action in relation to at least one of a power generator or power consuming device connected to the power grid.

The control system disclosed provides an estimation and/or calculation of the Remaining Operation Window time that would be powered by the Energy Storage Medium (ESM) after, for example, a failure. An ESM clearly presents a challenge for measuring an energy capacity of the ESM when compared to a combustion engine. A combustion engine uses a fuel-tank to store the energy, and the energy available is very well defined and easy to measure. An ESM however is more complicated. However by obtaining two important parameters it is feasible to estimate remaining operation window time with power from the ESM:

remaining energy in the battery;
active power needed to maintain the DP operation throughout the time window.

The remaining energy in battery is calculated from at least one of State of Charge (SOC) and State of Health (SOH). These two parameters may be measured and/or calculated by a Battery Management System or other control/management system in the case of a different medium for storing electrical energy. The present active power output is determined by the control system based on the present power output to the motor or motors that are presently running.

The principle advantage of the present invention is that an Energy Storage Medium (ESM) connected to the power distribution system can act efficiently as a "Spinning reserve" (even though it is not spinning) and supply active power quickly, or even instantaneously if required, in the event of failures in rotating machinery or a sudden load increase. If an ESM is used as a "spinning reserve", then fewer connected, running engines are needed which increases the average load on the running engines and hence both the efficiency of the installed equipment as well as the fuel efficiency during each DP operation. In other words, an advantage of the present invention is that it provides a greatly improved form of reserve power supply during a DP operation of a ship.

The disclosed invention comprises a combination of software and hardware. The software or computer programs may be part of the power management system or other onboard control system. The hardware mainly consists of computer or a system of computers, in addition to a system of sensors and interfaces to weather information and weather forecast services.

The invention increases the total efficiency of the vessels operation and reduces fuel consumption. It will also reduce the number of engines running at any one time and reduce the number or frequency of maintenance tasks for the engines well as maintenance costs for the owner. To be able to utilize the ESM as a "Spinning reserve" and to supply energy to the power plant after a failure in rotating machinery, it is vital that the ESM is actually capable of supplying the needed power to the power grid so that the vessel is capable of maintaining the current DP operation for the user defined time. In an embodiment of the invention the use of a State of Charge (SOC) unit/system is disclosed, amongst other functions and devices, for providing a determination based on measurement and/or calculation for how much electrical power is currently available from the energy storage medium. The methods and system with energy storage components may be advantageously applied as an upgrade or retrofit to existing vessels as well as being included when building new vessels. Thus existing vessels may be adapted to benefit from the improved provision of reserve power from one or more energy storage media as well as the increased fuel efficiency.

Additionally, since the ESM can be energized and filled during time spent at berth, with an on-shore electrical connection to the grid supplied from environmentally friendly, sustainable electrical energy sources, this invention decreases the environmental (carbon) footprint of future vessels.

A computer program, and a computer program recorded on a computer-readable medium are disclosed in another aspect of the invention.

It is to be noted that any feature of the first aspect may be applied to the second aspect and the third aspect, wherever appropriate. Likewise, any advantage of the first aspect may equally apply to the second aspect, and/or the third aspect, respectively, and vice versa. Other objectives, features and advantages of the enclosed embodiments will be apparent from the following detailed description, as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention.

Figure 8:
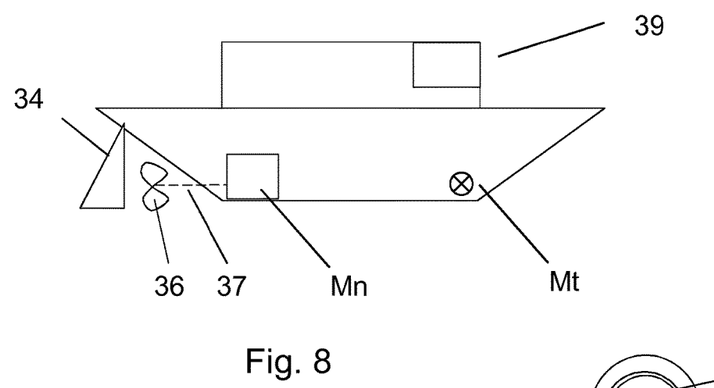
FIG. 8 shows a simplified diagram of a known layout for a ship with one or more propulsion unit suitable for practicing the methods of the invention of FIG. 1.
Figure 9:
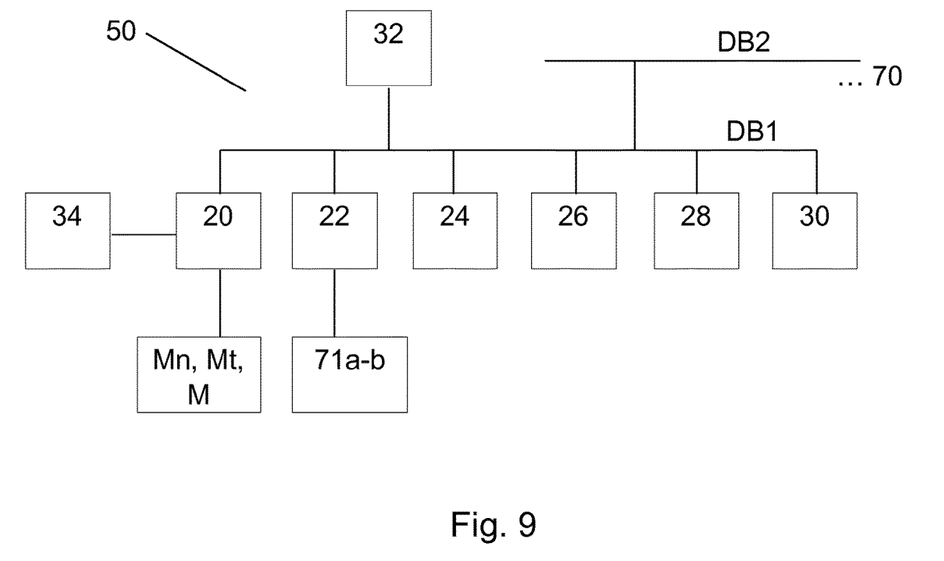
FIG. 9 is a block diagram of a control system of a ship according to a second aspect of the invention of FIG. 1.

FIG. 8 shows a simple sketch of a known ship 1'. The ship 1' as shown in FIG. 8 comprises a rudder 34 as well as a vessel propulsion element in the form of a propeller 36, which propeller 36 is connected to a motor Mn via a motor shaft 37 for allowing the motor to operate the propeller and in this case to rotate the propeller. The motor is thus equipped with the shaft 37. FIG. 9 thus shows traditional layout with a motor Mn mounted inboard connected by a shaft with a propeller mounted on the outside of the hull or the ship. Motor Mn is traditionally a combustion engine but may also be an electric motor. FIG. 8 also shows a bow thruster or tunnel thruster Mt mounted, for example, in a bow section of the ship 1 of FIG. 8 for delivering a thrust in a sideways direction relative to a direction of travel.

A drive motor may equally be configured with both motor and propeller, or impellor, mounted outside the main hull of a ship. One such drive unit or propulsion unit is the Azipod, the well-known electrically driven podded propeller or thruster unit supplied by ABB. When propulsion units or thrusters such as azimuth thrusters are mounted and arranged to apply thrust in a plurality of directions then a traditional rudder such as rudder 34 may not be necessary. In order to simplify the description only one main propeller has been shown in FIG. 8. It should however be realized that there may be several propellers. There may also be other types of vessel propulsion elements, for instance in the form of thrusters or podded thrusters mentioned above, where each vessel propulsion element may be operated by a corresponding motor.

In order to control the propeller 36 or thrusters and engine or motor Mn as well as the rudder 34, the ship 1' may be provided with a bridge 39, where various aspects of the ship 1' can be controlled. For example there may furthermore be ballast tanks (not shown) in the ship which may contain liquid such as water in order to influence the steering of the ship. These ballast tanks may be filled and emptied using pumps. FIG. 9 shows a block schematic for a simplified control unit 50 for controlling at least the power supply to one or more propellers, motors, thrusters or other propulsion units of the ship. The control unit 50 may be part of a computerized system controlling the propulsion, steering and other operational functions of the ship.

In FIG. 9 there is an operator terminal 32. The operator terminal 32 or workstation may be used by a user or operator for controlling various ship functions such as steering the ship and in particular for maintaining a position or a compass heading. For this reason the operator terminal 32 may with advantage be provided on a bridge of the ship such as a main or forward bridge 39; and/or in a wing bridge or auxiliary bridge overlooking the side or stem of the ship 1'. The operator terminal 32 is also connected to a first data bus DB1.

There is furthermore a group of ship handling computers 20-30 connected to a first data bus DB1. Inputs from sensors installed on the ship for making measurements such as vessel speed, wind strength, engine or motor parameters, present electrical power output and so on are supplied to one or more computers of the control unit 50. As well or instead, a value for active power output may also or instead be obtained from a motor drive system or variable speed drive controlling power output to the motor or motors. The computers of the group are provided for handling various aspects of the ship, such as navigation, engine optimisation and security aspects. The group comprises a maneuvering control computer 20, an engine parameter control computer 22, a forecasting computer 24, a tracking computer 26, a chart computer 28 and a sensor handling computer 30. These computers are involved in handling various aspects of the ship.

The maneuvering control computer 20 may be involved in controlling maneuvering such as steering using the rudder and controlling direction and speed through controlling one or more propellers or thrusters powered by each respective motor or engine. For this reason it is connected to the engine or motor or motors 71a-b, M, Mn, Mt and to the rudder 34 (if fitted). It may also control the ballast tanks in order to further influence the manoeuvrability. A second data bus DB2 is connected to a part of a power distribution system 70, which is described below.

Figure 7:
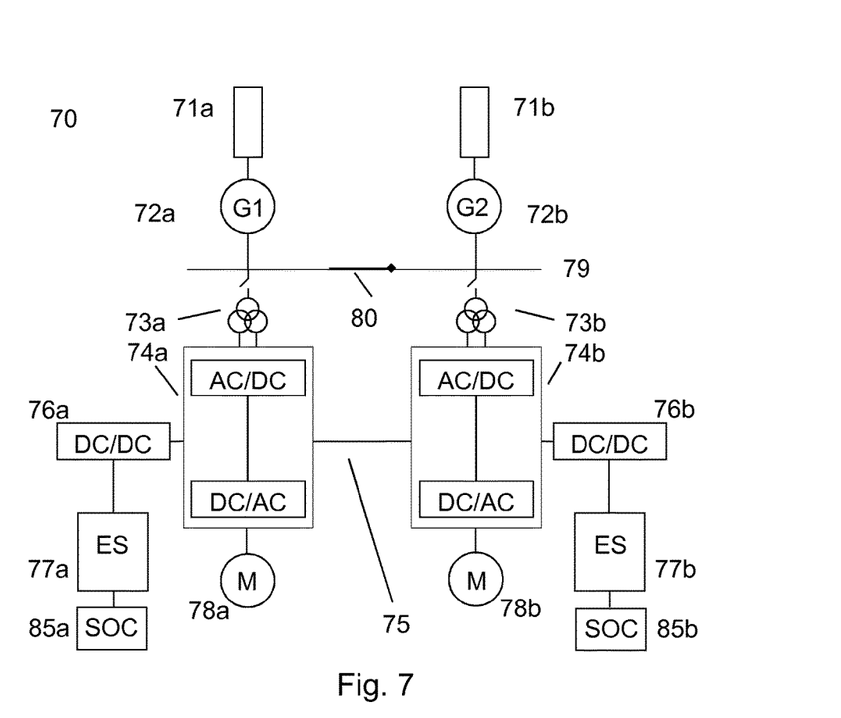
FIG. 7 shows a schematic block diagram of an electrical power grid suitable for use with the methods of the invention of FIG. 1.

FIG. 7 is a schematic diagram of a power distribution system or power grid 70 similar to a device known from a patent application EP2 423 103 entitled Electric propulsion of a ship incorporating an energy storage system; assigned to ABB Technology AG. One or more methods according to an embodiment of the invention may be practiced using the device shown in FIG. 7. However, methods of the invention may also be practiced with power distribution systems that have another layout or configuration. Other configurations may be used provided that they are arranged connected and switchable in order to distribute power such that a power flow may feed DC electrical power from an energy storage medium to a DC or an AC electrical consumer; or to feed electrical power from an electrical generator as electrical power to the energy storage medium; as required. In other words, the energy storage medium may be connected to an AC busbar or AC switchboard instead of a DC busbar or DC grid. The energy storage medium may be connected in parallel with AC supplies from one or more generators.

A method for controlling dynamic positioning of a vessel according to an embodiment will now be described using the device of FIG. 7 as an example of a suitable power distribution system. FIG. 7 shows a power distribution system 70, comprising at least two generators G1, G2 each powered by a prime mover 72a-b of some sort. The prime mover may be a combustion engine, preferably a diesel engine, a gas turbine, a steam turbine, an engine powered by LNG or boil-off gas, or similar.

The Figure shows an AC switchboard or busbar 79, two transformers 74a-b, two power converters 74a-b and two motors M. The Figure shows a DC bus 75, DC/DC converters 76a-b and two energy storage media 77a-b. The switchboard or busbar 79 may be arranged with an isolator 80 to isolate one side from the other. The figure also shows two energy storage media 77a-b also connected to the DC bus 75, preferably by means of via a DC/DC converter 76a or 76b. An ESM control unit 41 (not shown) may be connected to each of the energy storage media. Connected to at least one energy storage medium 77a-b is a unit or system 85a for determining a state of charge (SOC) of the energy storage medium. More than one SOC system 85a, 85b may be used.

The state of charge system may determine state of charge by means of measurements of one or more electrical parameters such voltage, current, capacitance, resistivity together with other parameters such as a temperature and/or a chemical parameter of the energy storage medium. State of charge may be determined in the system 85a, 85b by means of measurements, calculations which may include a computer model of the energy storage medium, or by using a combination of measurements and calculations. In addition to state of charge, a determination may be made of a State of Health (SOH) of the energy storage medium 77a, 77b. The SOH may be made by the State of Charge (SOC) system or by a separate functional unit dedicated to determining the degree of functional efficiency or State of health (SOH). For example the SOC system for a battery system would use one or more parameters from the group of: internal resistance, impedance, conductance, voltage, ability to accept a charge; and may typically comprise a value or a weighting based on how many charge-discharge cycles a battery has undergone. For other types of energy storage system different electrical and/or chemical and/or physical parameters may be used, including where appropriate a value for number of duty (charge-discharge) cycles.

In FIG. 7 AC electric power is generated in a generator such as G1 and/or G2 and supplied to the AC switchboard or bus 79. The AC power may be isolatable by a transformer 73a or 73b but under operating conditions the AC power is supplied to a power converter 74a and/or 74b. The power converter may be any suitable eg frequency-controlled or voltage-controlled power converter comprising the functions of an AC/DC rectifier with a DC/AC inverter. AC power is supplied further by a power converter 74a and/or 74b and switched so as to feed power to one or more propulsion motors M (or Mn, Mt).

In addition, electrical power can also be supplied to the DC bus 75 from an Energy Storage Medium and thus to one or more of the propulsion motors M, Mn, Mt according to the invention. The energy storage medium or media may be one or several such energy storage media connected to the power system 70. Electric power from one energy storage medium 77a, 77b, or both, may be supplied via the DC bus 75 preferably through one or more of the DC/DC converters 77a or 77b. An energy storage medium may comprise any configuration of batteries, accumulators, capacitors, supercapacitors and so on capable of storing an electrical charge. In this way, an additional reserve of electrical power is arranged stored in the electrical storage media 77a-b to take the place of a traditional "spinning reserve" generator-and-prime-mover arrangement and supply electrical power which may be fed instantaneously to propulsion motors M (and/or Mn, Mt) should an online generator such as G1 or G2 suddenly fail or reduce power output unexpectedly. Or in the case when the current power output faces a sudden or unexpectedly high demand for increased power.

The additional reserve of electrical power is particularly important as previously described in the case of dynamic positioning (DP) operations where a ship has to maintain a specific geographical position or a specific course heading in the face of winds, waves, tides or currents and similar navigational forces that change in magnitude and direction from time to time.

Figure 6A:
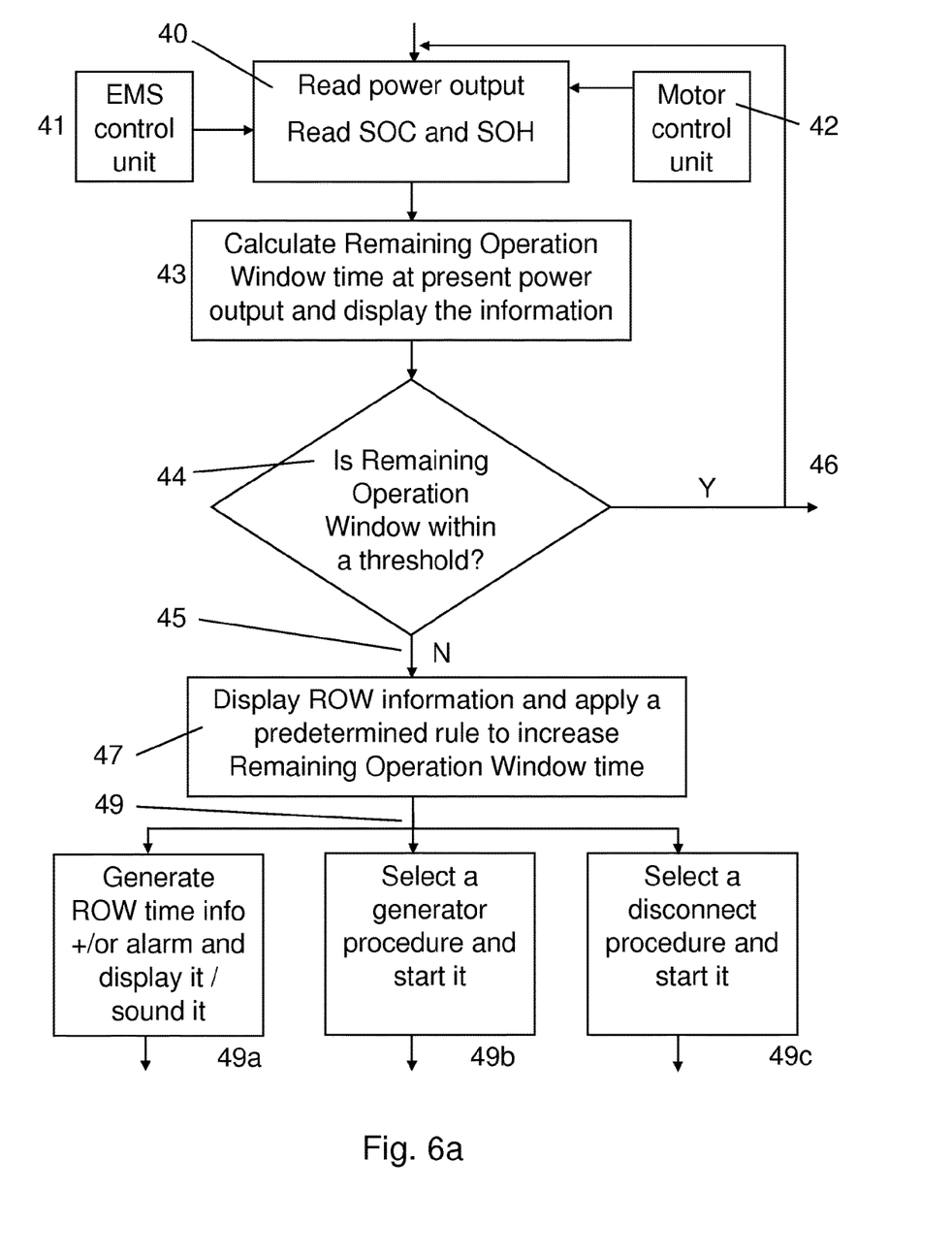

The operation of the invention according to a preferred embodiment will now be explained, mainly by reference to FIG. 6a and subsequently to FIG. 6b. The flowchart of FIG. 6a shows that the present instantaneous power output is read 40 from a motor control unit 42 or system or device such as the engine parameter control computer 22 (FIG. 8) as connected to one or more of the propulsion engines and/or motors M, Mn. A present value for active power output may also or instead be obtained from a motor drive system or variable speed drive controlling power output to the motor or motors. Parameter values are also read from a State of Charge system (SOC) 85a-b and a State of Health system (SOH) (not shown) which are used to determine a measure and/or estimate of the amount of energy currently available in each energy storage medium 77a, 77b. The measure and/or estimate of energy currently available in each storage medium is then used to calculate a value for a Remaining Operating Window, meaning a time period, beginning at the present time, during which the vessel can continue a current DP operation at the present level of output power, based on the amount of electrical energy presently available in each energy storage medium as a form of energy reserve. The Remaining Operation Window time calculated at step 43 is displayed to the operator in one or more ways, described below with reference to FIG. 1.

The amount of energy currently available in the energy storage medium or media is then compared at step 44 of FIG. 6a to the amount of energy required for a requested time period 10 required to complete a stage of DP operations. If the remaining time is within a configured threshold value, step 46 then operations continue and the monitoring of the power systems continues and repeats through steps 40 to 44. The result when the Remaining Operation Window time from step 43 is found to be sufficient may also be comprised in information displayed to the operator. A typical result of this calculation may be seen as represented by curve 10 in FIG. 1.

Figure 1:
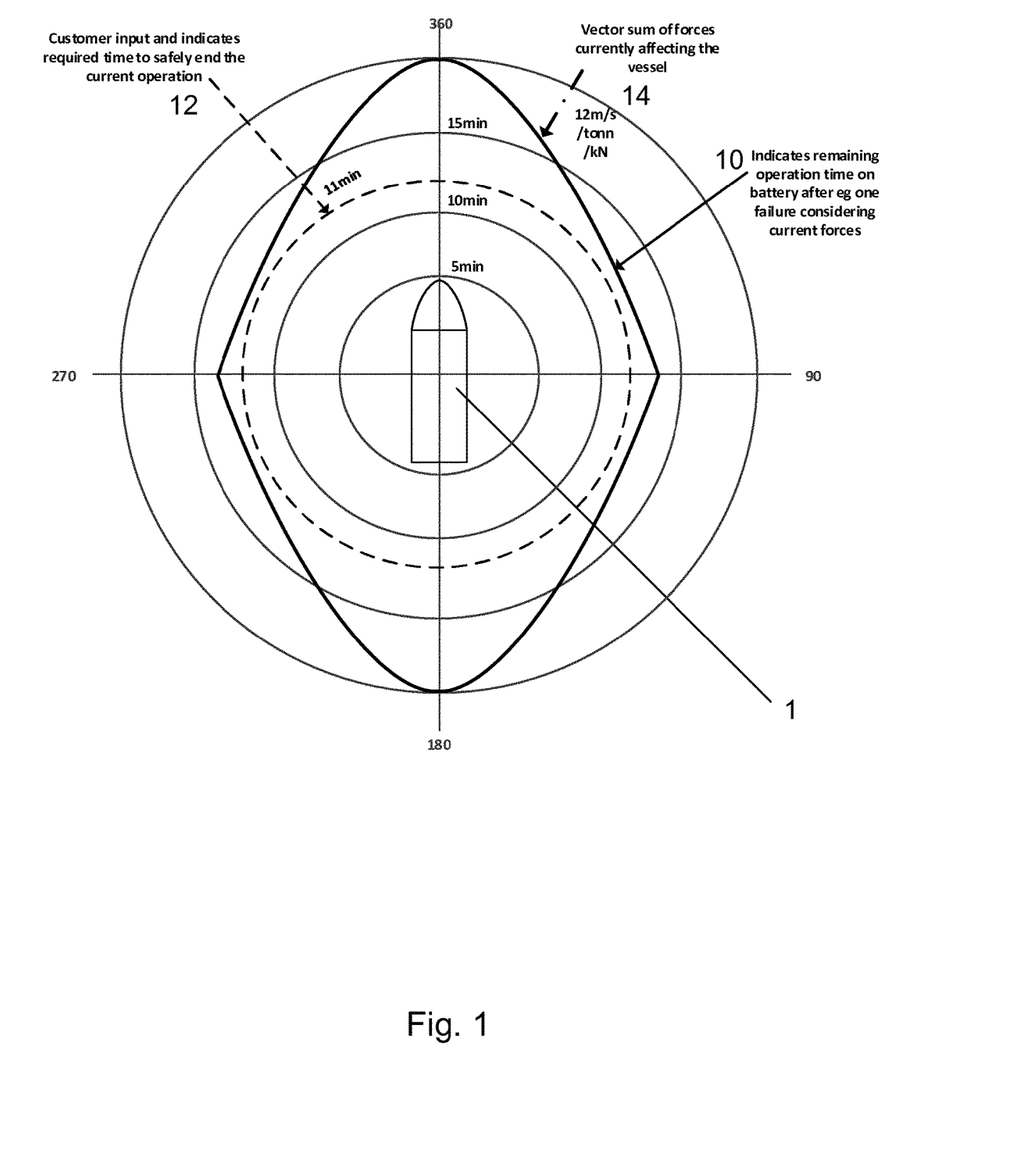
FIG. 1 shows schematically a graphical user interface displayed on a workstation of a control system and comprising information about the remaining operation window time of dynamic positioning, which information is provided by a method for controlling dynamic positioning of a vessel according to an embodiment of a first aspect of the invention.

FIG. 1 shows an operator display on a workstation 32 for control of the ship 1, 1'. The figure shows a compass rose diagram with two perpendicularly inclined axes depicting course headings from 360/0 round through 90, 180, 270 and back to 360. A number of concentric circles schematically present a series of operating window times, which in this exemplary diagram are indicated as operating time windows with durations of 5, 10, 15 minutes. A ship 1 is indicated displayed in the middle of the compass rose such that the present course heading of the ship is visible at a glance. A somewhat oval-shaped line or curve 10 shows the remaining operation window at the current power output in terms of a time period (or example as a number of minutes) of power which is currently available if required from the energy storage medium or media.

The shape of the operating window curve 10 depends on a function of external forces on the ship, for example the vector sum of forces currently affecting the vessel and the amount of stored (reserve) energy available from the energy storage medium or media. Thus with the bow or front of the ship on a heading of 0/360 the ship is shown to be less affected by the wind and waves. On a heading of 90, with the ship sideways on, the effect of the vector sum of wind and waves etc. on the ship is greater, and the remaining operating window available is therefore reduced because more power would be required to maintain the same heading when the ship is not eg facing directly into an oncoming wind. Thus the remaining operation window time may be reduced from 20 minutes on the heading of 360/0 to a window of less than 15 minutes on the heading of 90.

Figure 4:
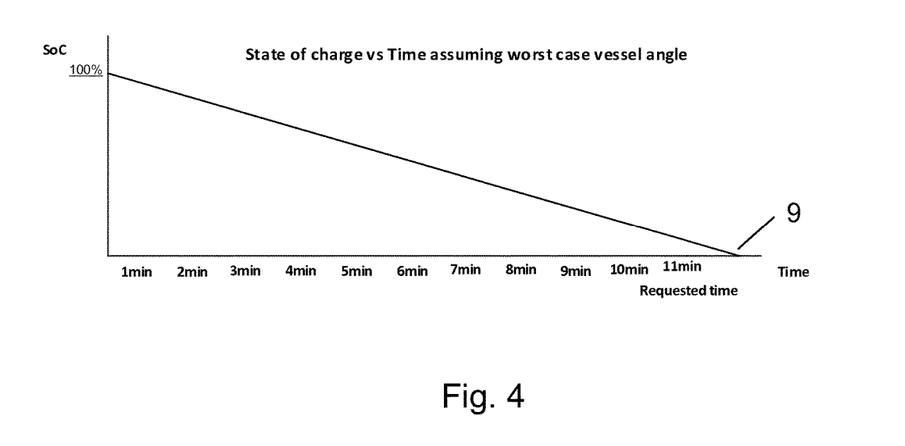

A particular stage of a DP operation may require, for example, 10 minutes to complete. For example a customer or end user provides an input, shown as the dashed circle 12 (10 mins), for the required time to safely end the current operation, the current stage of DP operations. Also shown in the diagram is a vector sum 14 of forces currently affecting the vessel. This sum may result from any combination of exteral disturbances such as wind, waves, a tide, a current etc. It can be seen that the remaining operation window indicated by the solid line 10 of around 11 minutes is sufficient to meet the required operation time 12 set in this example as 10 minutes, as shown by the dashed circle, to be completed safely. In other words, the remaining operation time on batteries (or other energy storage media) after eg one failure considering present power output and present forces exerted by external disturbances is sufficient; and the result of this determination is visible at a glance on the HMI display on workstation 32. This state is also shown schematically in FIG. 4, which shows a graph 9 of State of Charge against Time (minutes) assuming worst case vessel angle. The graph shows that the state of charge will be sufficient over a required time of eg 10 minutes. However, the display of FIG. 1 provides a more effective visualisation for an operator.

It should be noted that the amount of operating time available from the energy storage medium must be known with sufficient accuracy. Thus a SOC 85a, 85b system measuring or modelling, say, voltage alone may not reflect the amount of power that can actually be drawn. For example, if the energy storage medium has become less efficient over time and, for example, after many duty cycles. For this reason the SOC system preferably uses a plurality of parameters in the assessment of stored energy. Preferably a State of Health (SOH) system is also included to provide other measures of the present functional efficiency of the energy storage medium or media.

When it has been established, for example, at step 44 that the energy storage medium or media has/have sufficient electrical charge to supply electric power during a Remaining Operation Window the ESM is capable of powering the current DP operation. Thus the power grid 70 may be switched to provide or feed electrical power from at least one energy storage system to at least one electric motor driving one or more thrusters or propellers during a Remaining Operation Window time period. Using the present invention the electric power may be switched or fed to the motor or motors instantaneously; or else during a controlled time interval, as required. This functionality is not available when using the traditional type of spinning reserve.

Figure 5:
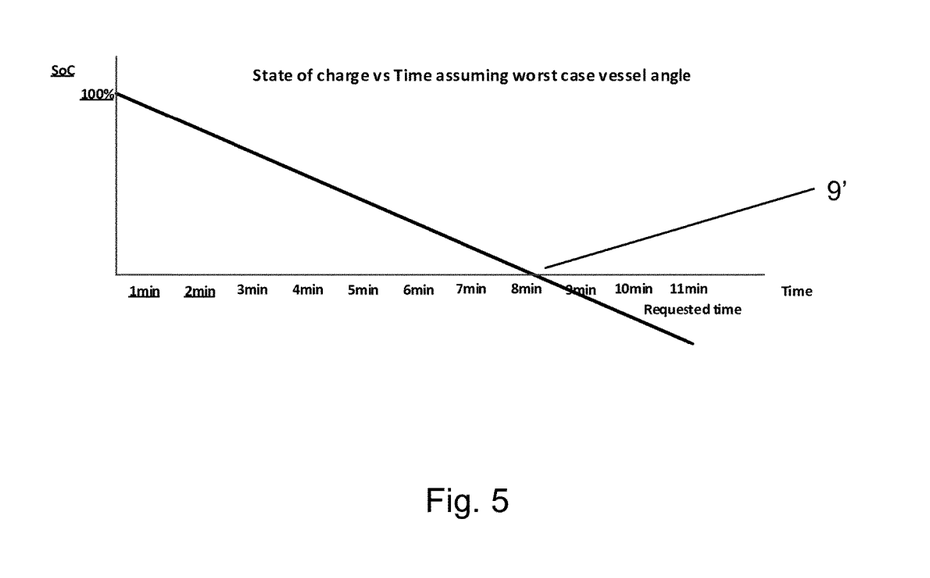

In the other case, referring again to FIG. 6*a*, when the Remaining Operation Window, the remaining time period during which the energy storage medium or media can supply power is not sufficient at step 45 in the flowchart, that information is provided and displayed. As well as that a predetermined rule is applied by a control unit in order to increase 47 the Remaining Operation Window, or increase the period of time available for remaining DP operations. The not-sufficient condition may also be seen in FIG. 5, a graph 9' of State of Charge (%) against Time (minutes), assuming worst case vessel angle. Here it is seen from the graph that the state of charge drops to zero before a required time (10) of eg 10 minutes would elapse. The result from step 47, that the Remaining Operation Window does not include sufficient time, is displayed to the operator, the display comprising at least line or curves 15 in FIG. 2.

FIG. 6*a* shows three exemplary sets of actions 49*a-c* for the case in which the Remaining Operation Window (time period) during which the energy storage medium or media can supply power is not sufficient or below a threshold. Any one or more instances of the three types of action may be initiated, depending on a predetermined rule as well as, for example, the amount by which the Remaining Operation Window has reduced below a pre-set threshold. Normally an alarm will always be initiated.

At 49*a* an alarm is generated; the alarm may include information about a Remaining Operation Window, in other words a maximum period of time for operating at the present power output. Optionally an alarm may also present a Remaining Operating Window (time in minutes) at one or more different levels of power output. The alarm state may include visible and/or audible signals, sounds, and/or blinking lights and so on. Information displayed about the Remaining Operating Window, for example graphically as shown 15 in FIG. 2, and/or as a numerical value for number of minutes of remaining operating time available at the present power output may be shown; remaining operating window at power output levels different from the present power output may be shown; and other combinations of variations of power output and/or course heading. If the required operation time exceeds the calculated expected time 20, an alarm needs to be issued, and automatic actions such as connection of an additional engine and/or generator; or a change of heading; or a disconnection of selected electrical consumers may be taken.

As shown in FIG. 6*a* at step 49*b* one or more generators may be increased in power or else a start-up/power up procedure begun to bring one or more additional generators or generator sets on line. At 49*c* one or more disconnect procedures may be selected according to a predetermined rule. This may include beginning an emergency disconnect operation, or starting a sequence of auxiliary actions that such an operation is predicated on, or required as a precondition (without judgement as to whether the disconnect operations themselves will ultimately be performed). Safe and secure disconnect operations may involve auxiliary sequences and main effector or actuator actions for disconnection or disengagement of gangways, risers, drill stacks, and any other machinery critical to a safe, secure, efficient, and non-damaging disconnection between the vessel and other systems, and cessation of a DP operation.

Figure 2:
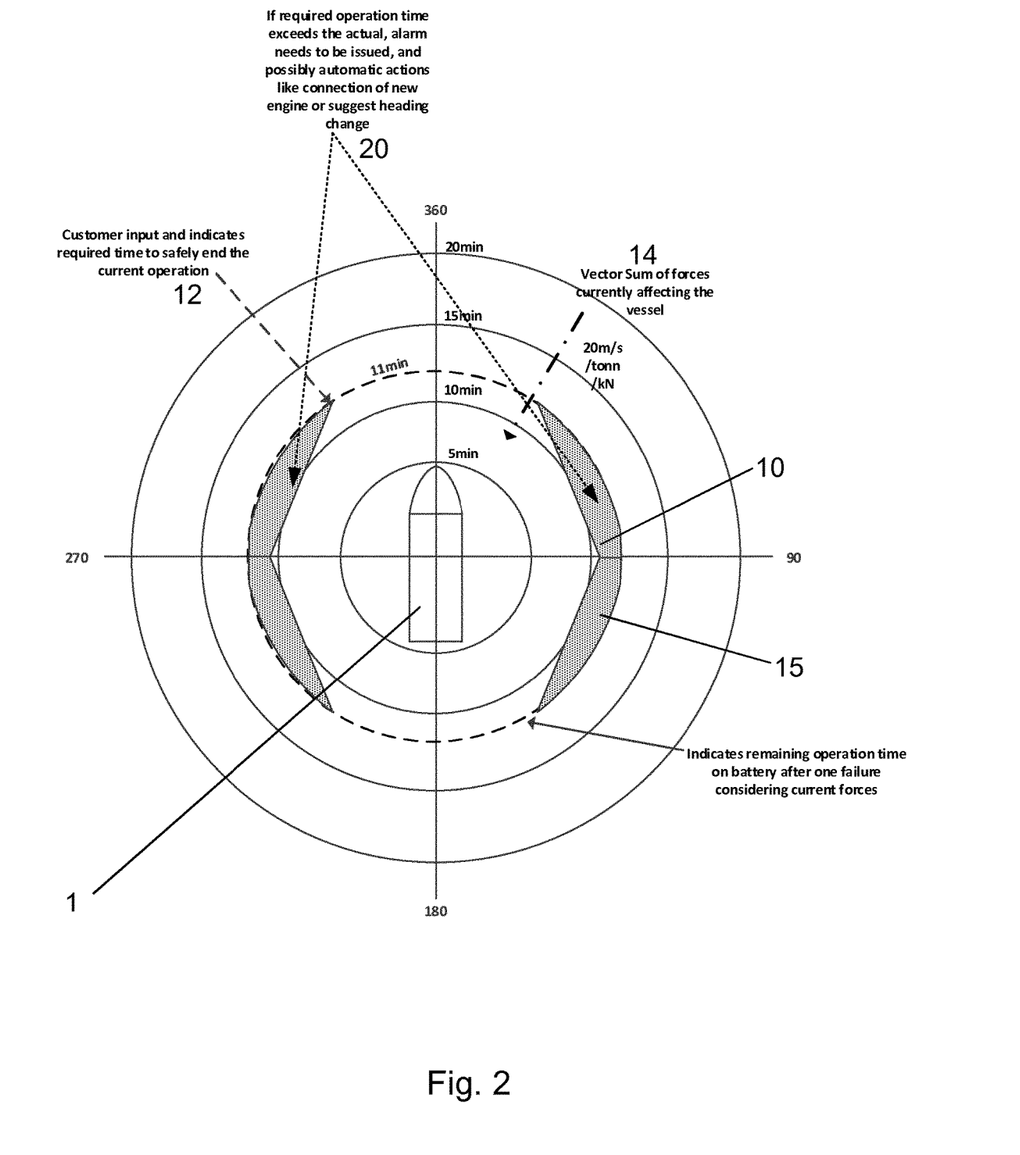
FIG. 2 shows the graphical user interface of the invention of FIG. 1 and in particular information showing that the remaining operation window time of dynamic positioning is calculated to be less than a required operation time, according to another embodiment of the present invention.

When at step 45 the Remaining Operation Window time is calculated to be less than the required time to complete a stage of a DP operation, or has dropped below a threshold, this state is calculated and displayed as shown in FIG. 2. FIG. 2 shows the same compass rose, headings and ship 1 as in FIG. 1. The function of external forces on the ship, such as the vector sum of forces 14 currently affecting the vessel may be measured and/or calculated and shown as a graphical symbol or a numerical value. The Remaining Operation Window has been calculated and displayed as solid line 10, shown here in the below-threshold case as forming two bracket-like lines on each side of the ship, and showing in a graphical way that the Remaining Operation Window for a course heading between about 030 to 120 is around 10 minutes (solid circle) which is less than the required time (dashed circle) of 11 minutes. Thus when the Remaining Operation Window is calculated at step 44 to be below threshold, ie to be less than the required time to complete the current DP operation, one or more values for Remaining Operation Window are displayed visually or visually and numerically on an operator workstation HMI. FIG. 2 shows two shaded areas 15 which indicate the headings for which required operation time is not sufficient. Other graphical, animated and/or numerical displays may be used to represent the respective headings for which the Remaining Operating Windows are not sufficient.

Another possible response to a below threshold 45 Remaining Operating Window time as well as actions 49*a-c* is for the vessel to change the course heading, and thus select a course that reduces the present power output. This may be done, for example in combination with one or more of 49*b*, 49*c*; however this option is often not freely available because changing the course heading may negatively affect the safe or effective DP operation that is being carried out. A graphical, animated and/or numerical display may be used to represent a course heading or alternative course heading for which the Remaining Operating Window has been calculated to be sufficient.

The engine parameter control computer or engine parameter control device 22 is connected to one or more engines 71*a*, 71*b* acting as prime movers for an electric power distribution system of the ship. The engine parameter control computer may control various engine properties such as fuel consumption and/or exhaust emissions. It is also connected to other parts of the ship. It is also possible that the engine parameter control functionality is combined with the maneuvering control functionality. Therefore there may as an alternative be one maneuvering and energy parameter control computer.

The embodiment of FIGS. 1 and 2 has been described in the context of a relatively static mode for handling DP operations. In a preferred embodiment described below in respect of FIG. 3, a more dynamic mode is disclosed, based in particular on using a weather prediction or weather trend to predict a Remaining Operation Window time at a future point in time. The weather forecast (432) may be for a predetermined period of time and at a time which is hours or minutes later than a present time.

Figure 3:
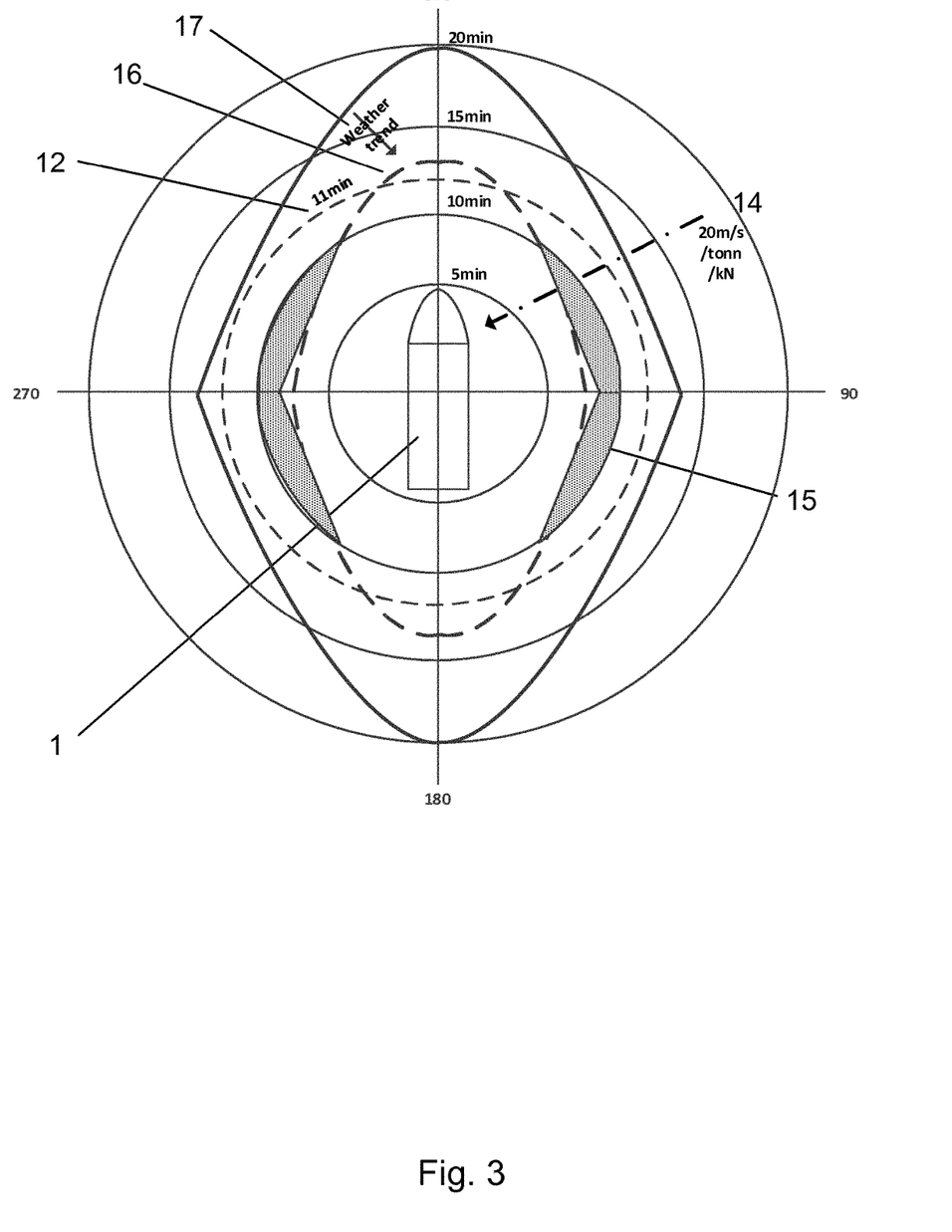
FIG. 3 shows the graphical user interface of the invention of FIG. 1 and in particular information showing a remaining operation window time of dynamic positioning calculated in respect of weather as forecasted according to another embodiment of the present invention, FIG. 4, 5 each show a diagram of state of charge versus remaining operation time under different conditions for an energy storage medium according to the invention of FIG. 1, FIG. 6a, 6b show a flowchart of a method for carrying out the invention of FIG. 1 according to an embodiment and to a further and dynamic embodiment, respectively.

FIG. 3 is a display showing an exemplary result of applying methods of the invention in a further and preferred embodiment in which a weather forecast or prediction for weather is used. The weather prediction is used to calculate a prediction for a vector sum of external forces on the ship. FIG. 3 is a similar display to those of FIGS. 1, 2 except that it also includes a predicted weather element, or a weather trend 17. The predicted weather is used to calculate a new value for a predicted function of external forces on the ship, such as predicted vector sum of the forces 14 acting on the vessel. The Remaining Operation Window according to such a vector sum based on predicted weather is shown as a dashed ROW curve 16. In the example of FIG. 3, the present Remaining Operating Window 10 based on conditions at present is a greater number of minutes than the predicted Remaining Operation Window 16 based on the weather trend. For example on a straight-ahead heading of 360/0 the Remaining Operation Window is calculated at almost 20 minutes but the predicted Remaining Operation Window 16 is reduced to some 12 minutes. In this way a weather prediction or weather trend may be used to calculate a predicted Remaining Operation Time for a time in the near future and thus provide advance notice of a predicted change in DP capability. In other words, the dynamic embodiment is based on using a weather forecast, prediction or weather trend to calculate and predict a Remaining Operation Window time at a future point in time. This may not only be for a point in time some minutes later or during the next hour; it may also be calculated for a point in time which is some hours later. Thus a Remaining Operation Window time may be calculated for a predetermined period of time which may be at a future time, some hours later than the present time, which may be a predetermined period of minutes or hours.

Figure 6B:
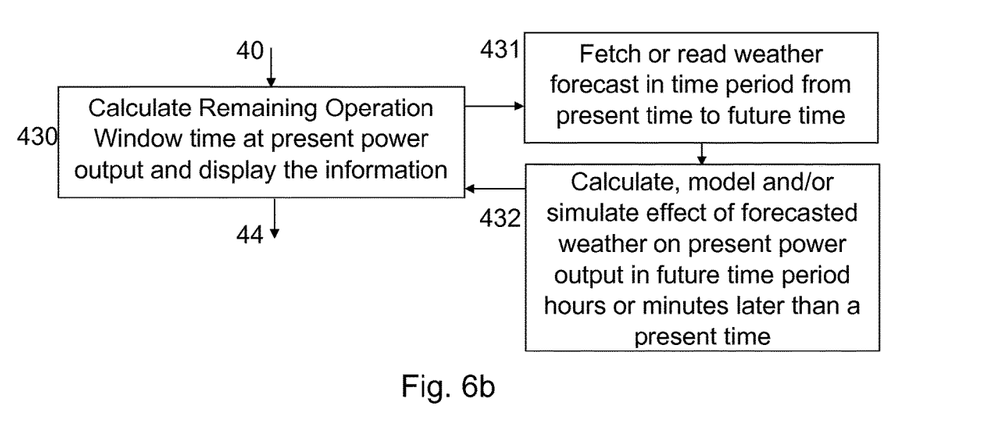

FIG. 6b shows step 430 (similar to step 43 in FIG. 6a) and a data gathering step 431 and a calculation or modelling step 432. In step 431 a weather forecast is retrieved, downloaded or otherwise obtained for a future time which is typically a time extending forward from present time to a future time. The future time may be at any time in the future from many minutes to many hours. In step 432 the effect of the forecasted weather on present power output during the time period from eg present time to future time is calculated, modelled and/or simulated. For example the effect of forecasted changes in wind strength and/or direction on the estimated vector sum of forces (14 in FIGS. 1-3) on the vessel may be calculated, modelled and/or simulated and the value of the present power output found in step 40 is then adapted in step 432 according to one or more predetermined rules.

Thus a dynamic mode related to (a) calculation, (b) reaction to, and (c) visualization of the Remaining Operation Window ROW as based on the disclosed methods provides the functional equivalent of a spinning reserve with respect to status and availability may also be further optimised by applying one or more statistically sound forecasts of the development of environmental disturbances within the horizon of interest. In other words, the first and static mode (FIGS. 1, 2) assumes that the environmental disturbances do not change in severity and/or direction for at least the duration of the present horizon of interest. Whereas the dynamic mode assumes the environmental disturbances will change. Further, that the change may be modelled, for example to a provisional confidence interval less than 100%, including a worst-case scenario analysis within the confidence interval, by using a validated and tested, statistically sound estimator and/or model.

The benefit of this dynamic mode, in addition to the benefits of the previous static mode, which it subsumes, is the ability to confine the visualization, alarm philosophy and method of operation of the DP vessel to a provisional confidence interval. This provides decision support and a calculated basis for operator actions when operating a vessel in DP operations. It is a particular advantage when applied to locations, vessels and/or external forces or environmental disturbances such as weather conditions that a user or operator may have had limited experience of. Thus the DP operator, even an operator with limited experience, using a relatively familiar and intuitive DP plot and auxiliary linear and polar plots, bar graphs, and other indicators as parts of the graphical user interface, may use methods of operation of the vessel that are responsive to a statistically significant worst-case scenario.

Figure 10:
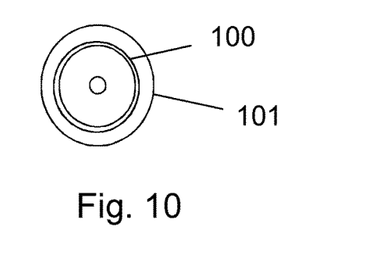
FIG. 10 shows schematically a computer-readable medium comprising software code portions or computer code for carrying out the method according the invention of FIG. 1.

The methods as described above in relation to FIG. 6a, 6b and elsewhere in this specification may be carried out by a computer application comprising computer program elements or software code which, when loaded in a processor or computer, causes the computer or processor to carry out the method steps. FIG. 10 shows schematically a computer program 100 recorded on a data carrier or computer readable media 101.

The functions of the method and/or system may be carried out by processing digital functions, algorithms and/or computer programs and/or by analogue components or analogue circuits or by a combination of both digital and analogue functions. The methods of the invention may, as previously indicated, be carried out by means of one or more computer programs comprising computer program code or software portions running on a computer or a processor. The microprocessor (or processors) comprises a central processing unit CPU performing the steps of the method according to one or more facets of the invention. The or each processor may be arranged with a memory storage unit in any of a system controller, control unit 50, a maneuvering control computer 20, engine parameter control device or computer 22, State of Charge SOC system 85a-b or a PLC (programmable Logic Controller) or other system part thereof, or may as well run in a local or central control system in a local or distributed computerized control system. A processor or other hardware or configurable hardware such as a Field-Programmable Gate Array (FPGA) or processors including a Complex Programmable Logic Device (CPLD) or an Application Specific Integrated Circuit (ASIC) or similar may be used.

The computer program comprises computer program code elements or software code portions that make the computer perform the method using equations, algorithms, data, stored values and calculations previously described in relation to eg. FIG. 6. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, such as a CD (compact disc) or a DVD (digital versatile disc), hard disk, magneto-optical memory storage means, in volatile memory, in flash memory, as firmware, stored on a data server or on one or more arrays of data servers. Computer programs as well as present or historical operating data for the energy storage medium and/or the power distribution system; as well as weather data and weather forecast data, may be made available for retrieval, storage, delivery or, in the case of programs, execution over private networks, via a private or open satellite communication system and/or over open networks such as the Internet. Data may be accessed by means of any of: OPC or OPC/UA servers, an Object Request Broker such as COM, DCOM or CORBA, a web service.

It is to be understood that, if any prior art publication is referred to herein, such reference does not constitute an admission that the publication forms a part of the common general knowledge in the art, in Sweden or any other country. The scope of the claims should not be limited by the preferred embodiments set forth in the examples, but should be given the broadest interpretation consistent with the description as a whole.

The invention claimed is:

1. A method for controlling dynamic positioning of a vessel, which vessel comprises an electrical power grid, at least one combustion engine driven power generator, and an energy storage medium, which power grid is arranged to provide power to an electric motor driving one or more thrusters or propellers of the vessel, wherein the control system includes a control unit arranged with computer programs and hardware configured to:
calculate a Remaining Operation Window time for carrying out dynamic positioning powered by the energy storage medium,
generate and display information including a time period for the Remaining Operation Window of dynamic positioning, and in case the Remaining Operation Window time during which the energy storage medium can supply power is not sufficient or below a threshold, and
carry out an automatic control action in relation to at least one of a power generator or power consuming device connected to the power grid, wherein the automatic control action is a predetermined rule applied by the control unit in order to increase the Remaining Operation Window, or increase the period of time available for remaining dynamic positioning operations.

2. The method according to claim 1, wherein the remaining operation window time is calculated based on a value for at least one of a state of charge or state of health for the energy storage medium.

3. The method according to claim 1, wherein the remaining operation window time is calculated based on calculated and/or measured present active power output and a function of external forces acting on the vessel based on a present weather condition measurement.

4. The method according to claim 1, wherein the remaining operation time is calculated based on measured and/or calculated active power output and a forecast value for a weather condition or a weather forecast during a predetermined period of time at a time which is hours or minutes later than a present time.

5. The method according to claim 1, wherein an alarm is generated when the Remaining Operation Window is calculated to be a time period of less than a predetermined time duration or threshold.

6. The method according claim 1, wherein a confidence interval is calculated for the time period information including the Remaining Operation Window and displayed.

7. The method according to claim 1, wherein at least one of a start-up procedure is begun for at least one additional combustion engine driven power generator and/or a disconnect procedure is begun according to a predetermined priority for disconnection for at least one power consuming device.

8. The method according to claim 1, wherein the disconnect procedure is begun for at least one non-propulsion power consuming device from the group of: gangway, riser, drill stack, heave compensation system; according to a predetermined priority for disconnection.

9. The method according to claim 1, wherein the power grid is switched during a controlled time interval, or instantaneously, so providing electrical power from at least one energy storage system to at least one electric motor driving one or more thrusters or propellers during a Remaining Operation Window time period of DP operation.

10. A control system for controlling dynamic positioning of a vessel, including an electrical power grid, at least one combustion engine driven power generator, and an energy storage medium, which power grid is arranged to provide power to an electric motor driving one or more thrusters or propellers of the vessel, wherein the control system includes a control unit which is arranged with computer programs and hardware configured for carrying out the steps of:
calculating a remaining operation time for carrying out dynamic positioning powered by the energy storage medium,
generating and displaying information including the remaining operation time of dynamic positioning, and in case the Remaining Operation Window time during which the energy storage medium can supply power is not sufficient or below a threshold, and
carrying out an automatic control action in relation to at least one of a power generator or power consuming device connected to the power grid, wherein the automatic control action is a predetermined rule applied by the control unit in order to increase the Remaining Operation Window, or increase the period of time available for remaining dynamic positioning operations.

11. The system according to claim 10, wherein the remaining operation window time is calculated based on at least one of a state of charge or state of health for the energy storage medium.

12. The system according to claim 10, wherein the remaining operation window time is calculated based on a measured and/or calculate present active power output and a function of external forces acting on the vessel based on at least one of: a current weather condition measurement; a forecast value for a weather condition during a predetermined period of time at a time which is hours or minutes later than a present time.

13. The system according to claim 10, wherein an alarm is generated when the remaining operation window time is calculated to be less than a predetermined operating window time.

14. The system according to claim 10, wherein a representation of the remaining operation window time and a representation of the time required to safely end a current operation are displayed together on a control system workstation of the vessel with a representation of the vessel and a representation of at least one of: a current compass heading; a proposed compass heading.

15. The system according to claim 10, wherein a confidence interval is calculated for the information including the remaining operation window time and displayed.

16. The system according to claim 10, wherein at least one of: a start-up procedure is begun for at least one additional combustion engine driven power generator and/or a disconnect procedure is begun for at least one power consuming device according to a predetermined priority for disconnection.

17. The system according to claim 10, wherein the disconnect procedure is begun for at least one non-propulsion, power consuming device from the group of: gangway, riser, drill stack, heave compensation system; according to a predetermined priority for disconnection.

18. The method according to claim 10, wherein the power grid is switched during a controlled time interval, or instantaneously, so as to provide electrical power from at least one energy storage system to at least one electric motor driving one or more thrusters or propellers during a Remaining Operation Window time period of dynamic positioning operation.

19. A non-transitory computer-readable medium including software code portions or a computer program which when read into a computer or processor will cause the computer or processor to carry out a method for controlling dynamic positioning of a vessel, which vessel comprises an electrical power grid, at least one combustion engine driven power generator, and an energy storage medium, which power grid is arranged to provide power to an electric motor driving one or more thrusters or propellers of the vessel, wherein the method includes the steps:

calculate a Remaining Operation Window time for carrying out dynamic positioning powered by the energy storage medium, generate and display information including a time period for the Remaining Operation Window of dynamic positioning, and in case the Remaining Operation Window time during which the energy storage medium can supply power is not sufficient or below a threshold, and carry out an automatic control action in relation to at least one of a power generator or power consuming device connected to the power grid, wherein the automatic control action is a predetermined rule applied by the control unit in order to increase the Remaining Operation Window, or increase the period of time available for remaining dynamic positioning operations.

20. The method according to claim 3, wherein the remaining operation time is calculated based on measured and/or calculated active power output and a forecast value for a weather condition or a weather forecast during a predetermined period of time at a time which is hours or minutes later than a present time.

* * * * *

UNITED STATES PATENT AND TRADEMARK OFFICE
CERTIFICATE OF CORRECTION

PATENT NO. : 10,281,918 B2
APPLICATION NO. : 16/060670
DATED : May 7, 2019
INVENTOR(S) : Borre Gundersen Page 1 of 1

It is certified that error appears in the above-identified patent and that said Letters Patent is hereby corrected as shown below:

In the Claims

Column 14, Claim 9, Lines 6-11:
"The method according to claim 1, wherein the power grid is switched during a controlled time interval, or instantaneously, so providing electrical power from at least one energy storage system to at least one electric motor driving one or more thrusters or propellers during a Remaining Operation Window time period of DP operation."

Should read:
--The method according to claim 1, wherein the power grid is switched during a controlled time interval, or instantaneously, so providing electrical power from at least one energy storage system to at least one electric motor driving one or more thrusters or propellers during a Remaining Operation Window time period of dynamic positioning operation.--

Signed and Sealed this
Second Day of July, 2019

Andrei Iancu
*Director of the United States Patent and Trademark Office*